United States Patent
Souma (10) Patent No.: US 7,369,322 B2
(45) Date of Patent: May 6, 2008

(54) IMAGING OPTICAL SYSTEM AND IMAGE PICKUP APPARATUS

(75) Inventor: Yoshihito Souma, Sakai (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 0 days.

(21) Appl. No.: 11/645,952

(22) Filed: Dec. 27, 2006

(65) Prior Publication Data
US 2007/0171543 A1    Jul. 26, 2007

(30) Foreign Application Priority Data
Jan. 13, 2006  (JP) .............................. 2006-005957

(51) Int. Cl.
G02B 15/14   (2006.01)
H04N 5/262   (2006.01)
(52) U.S. Cl. .................................... 359/680; 348/240.3
(58) Field of Classification Search ............ 348/240.3, 348/240.99; 359/680, 681, 682, 684
See application file for complete search history.

(56) References Cited

U.S. PATENT DOCUMENTS 6,008,952 A * 12/1999 Yamamoto .................. 359/683
6,480,340 B1 * 11/2002 Yamamoto .................. 359/676
6,515,803 B2 * 2/2003 Hirose ........................ 359/682

FOREIGN PATENT DOCUMENTS

JP   2001-174704 A   6/2001
JP   2004-271937 A   9/2004

* cited by examiner

Primary Examiner—David N. Spector
(74) Attorney, Agent, or Firm—Sidley Austin LLP (57) ABSTRACT

An imaging optical system which is a small-sized and wide angle of view a zoom lens, and whose aberration is finely corrected, is provided. In the imaging optical system, it has the first lens group of negative power, the second lens group of positive power, the third lens group of negative power, the fourth lens group of the positive and the following lens group, and the first lens group is fixed with respect to the image plane during zooming and focusing, and during zooming at least the lens group constituting the following lens group is moved within an adequate range, and the distance between the most image side surface of the following lens group and the image plane is set in an adequate range.

15 Claims, 10 Drawing Sheets

IMAGING OPTICAL SYSTEM AND IMAGE PICKUP APPARATUS

This application is based on Japanese Patent Application No. 2006-005957 filed on Jan. 13, 2006, in Japanese Patent Office, the entire content of which is hereby incorporated by reference.

TECHNICAL FIELD

The present invention relates to an imaging optical system and an image pickup apparatus, and particularly to an imaging optical system whose image pickup magnification is variable.

BACKGROUND

Recently, following the spread of the personal computer, a digital camera by which an image can be easily taken into the personal computer is spread. Further, a case where a digital camera is assembled into an information processing device such as a mobile computer, cell phone, Personal Digital Assistant (PDA) is also come into common use. Following such a spread of the digital camera, a more compact digital camera is required, and it is necessary that the imaging optical system is also further down-sized.

Further, as the imaging optical system of the digital camera, a zoom optical system is required, and in it, an optical system whose wide angle side is wider than before is required.

Accordingly, in order to make the zoom optical system wide angle of view and down-sized, in Japanese Laid-Open Patent publication No. 2001-174704, the five-groups composition in which the power arrangement of negative, positive, negative, positive, positive, in the order from an object side is made is disclosed, lens groups except the third lens group are moved to realize zooming, and a wide angle of view zoom lens of about 3 times is proposed. Further, in Japanese Laid-Open Patent publication No. 2004-271937, in the five groups composition in which the power arrangement of negative, positive, negative, positive, positive, in the order from an object side is made, each group is individually moved during zooming, and a wide angle of view zoom lens of about 5 times is proposed.

However, in the optical system written in Japanese Laid-Open Patent publication No. 2001-174704, the first lens group is moved during zooming, further, the effective diameter of the first lens group is large, and the size of the optical system becomes large for mounting it in the digital camera that is required to be down-sized. Further, the optical system written in Japanese Laid-Open Patent publication No. 2004-271937 is wide angle of view and the variable magnification ratio is large, however, the structure of the complicate drive mechanism of cam by which each lens group is individually moved during zooming becomes necessary, the image pick-up apparatus is large-sized, and further, the large drive force is necessary and the power consumption is increased.

SUMMARY

In view of such problems, the present invention is attained, and an object of the present invention is to provide an imaging optical system which is a small-sized and wide angle of view zoom lens, and whose aberration is finely corrected. In view of forgoing, one embodiment according to one aspect of the present invention is an imaging optical system for imaging light from an object side on an image pickup device, comprising in order from the object side:

a first lens group with negative power, which is fixed with respect to an image plane during focusing and zooming;

a second lens group with positive power;

a third lens group with negative power;

a fourth lens group with positive power; and a following lens group, wherein at least a moving lens group constituting the following lens group moves during zooming, and a movement distance MGB of the moving lens group from a wide angle end to a telephoto end, an overall focal length fw at the wide angle end, an over all focal length ft at the telephoto end, a distance LB between the most image side surface and the image plane which is minimum over a full zooming range and a diagonal length y of the image pickup device satisfy the following relationships:

$$0.2 < MGB/(fw \times ft)^{1/2} < 1.5$$

$$LB/y < 0.8$$

According to another aspect of the present invention, another embodiment is an image pickup apparatus, comprising:

an image pickup device for converting incident light into electric signals; and an imaging optical system for imaging light from an object side on the image pickup device, the imaging optical system including in order from the object side:

a first lens group with negative power, which is fixed with respect to a image plane during focusing;

a second lens group with positive power;

a third lens group with negative power;

a fourth lens group with positive power; and a following lens group, wherein at least a moving lens group constituting the following lens group moves during zooming, and a movement distance MGB of the moving lens group from a wide angle end to a telephoto end, an overall focal length fw at the wide angle end, an over all focal length ft at the telephoto end, a distance LB between the most image side surface and an image plane which is minimum over a full zooming range and a diagonal length y of the image pickup device satisfy the following relationships:

$$0.2 < MGB/(fw \times ft)^{1/2} < 1.5$$

$$LB/y < 0.8$$

BRIEF DESCRIPTION OF THE DRAWINGS

FIG. 1(*a*) is a front view typically showing the appearance of a digital camera of an embodiment of the present invention.

FIG. 1(*b*) is a rear view typically showing the appearance of a digital camera of an embodiment of the present invention.

DETAILED DESCRIPTION OF THE PREFERRED EMBODIMENT

Figure 1A:
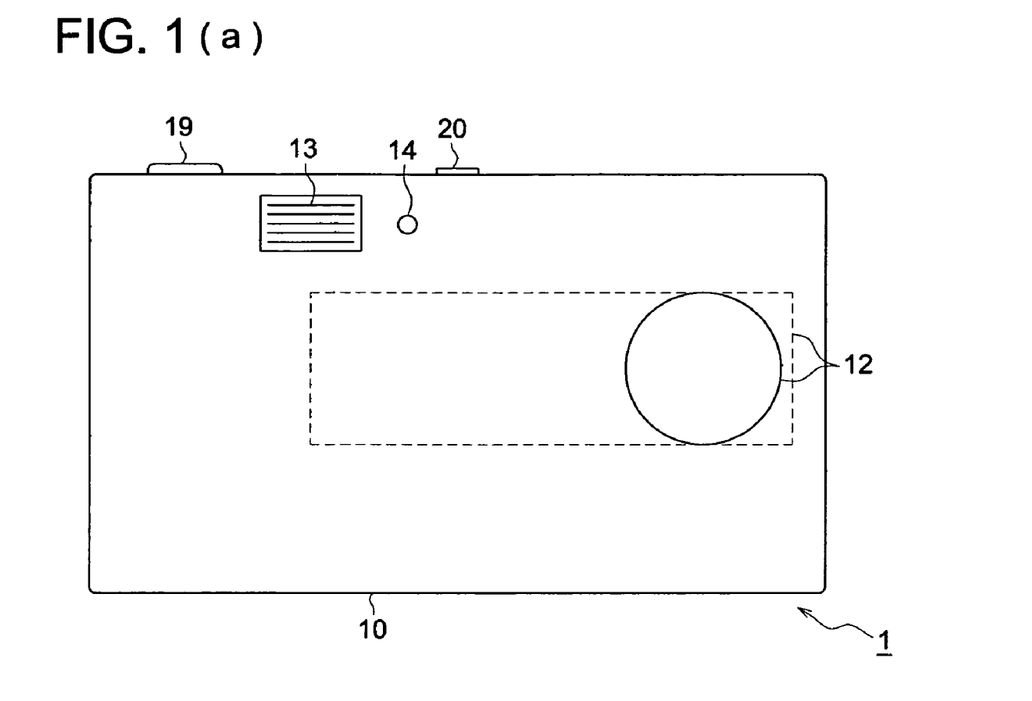
Figure 1B:
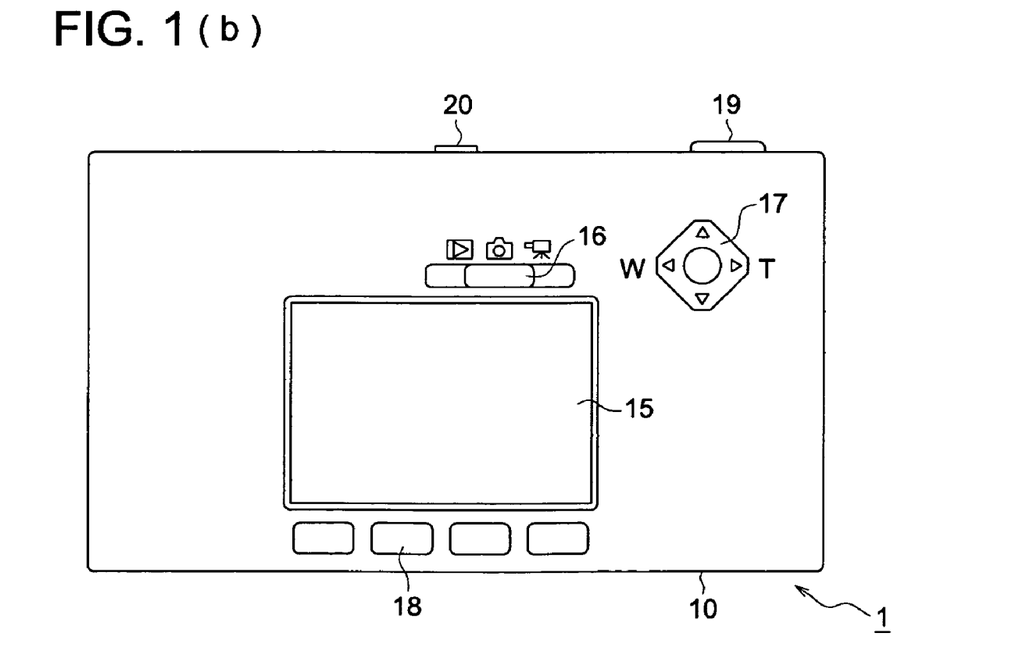

Referring to the drawings, the embodiment of the present invention will be described below. While the preferred embodiments of the present invention have been described using specific terms, such description is for illustrative purpose only, and it is to be understood that changes and variations may be made without departing from the spirit or scope of the appended claims. An appearance of the digital camera which is an embodiment of the present invention is typically shown in FIG. 1(a), FIG. 1(b). FIG. 1(a) is a front view, and FIG. 1(b) is a rear view.

The digital camera 1 is provided with, on a front surface, an imaging optical system 12, flash emitting section 13, self-timer lamp 14, and on a rear surface, a display section 15, mode setup switch 16, cross button 17, a plurality of operation buttons 18, and on the upper surface, shutter start button 19, power button 20.

In the imaging optical system 12, its one part is arranged on the front surface of a casing 10, and the optical axis is bent about orthogonally by a reflection optical member which will be described later, and a the rest part of the lens is arranged inside of the casing 10 as shown by a dotted line of FIG. 1(a). The flash emitting section 13 emits the flash light for illuminating the photographic object. The self timer lamp 14 shows by lighting that the preparation of the self timer image pick-up is proceeding now.

The display section 15 is composed of a liquid crystal display, and displays other than the picked up image an information such as a setting status of the digital camera 1 or operation guide. The mode setup switch 16 is a slide type, and is used for setting of the operation mode of the digital camera 1. The cross button 17 has 4 contacts, upper, lower, left, and right, and is used for movement of the cursor displayed on the display section 15. The imaging optical system 12 is provided with a zoom lens, and the cross button 17 is used also for the adjustment of the focal distance. The operation buttons 18 are used for the setting relating to the function of the digital camera 1 such as a switching of items to be displayed on the display section 15 selection of displayed items. The shutter start button 19 operates at 2 steps, and is used for the instruction of the image pick-up preparation of the image to be recorded and the instruction of the image pick-up of the image to be recorded.

Figure 2:
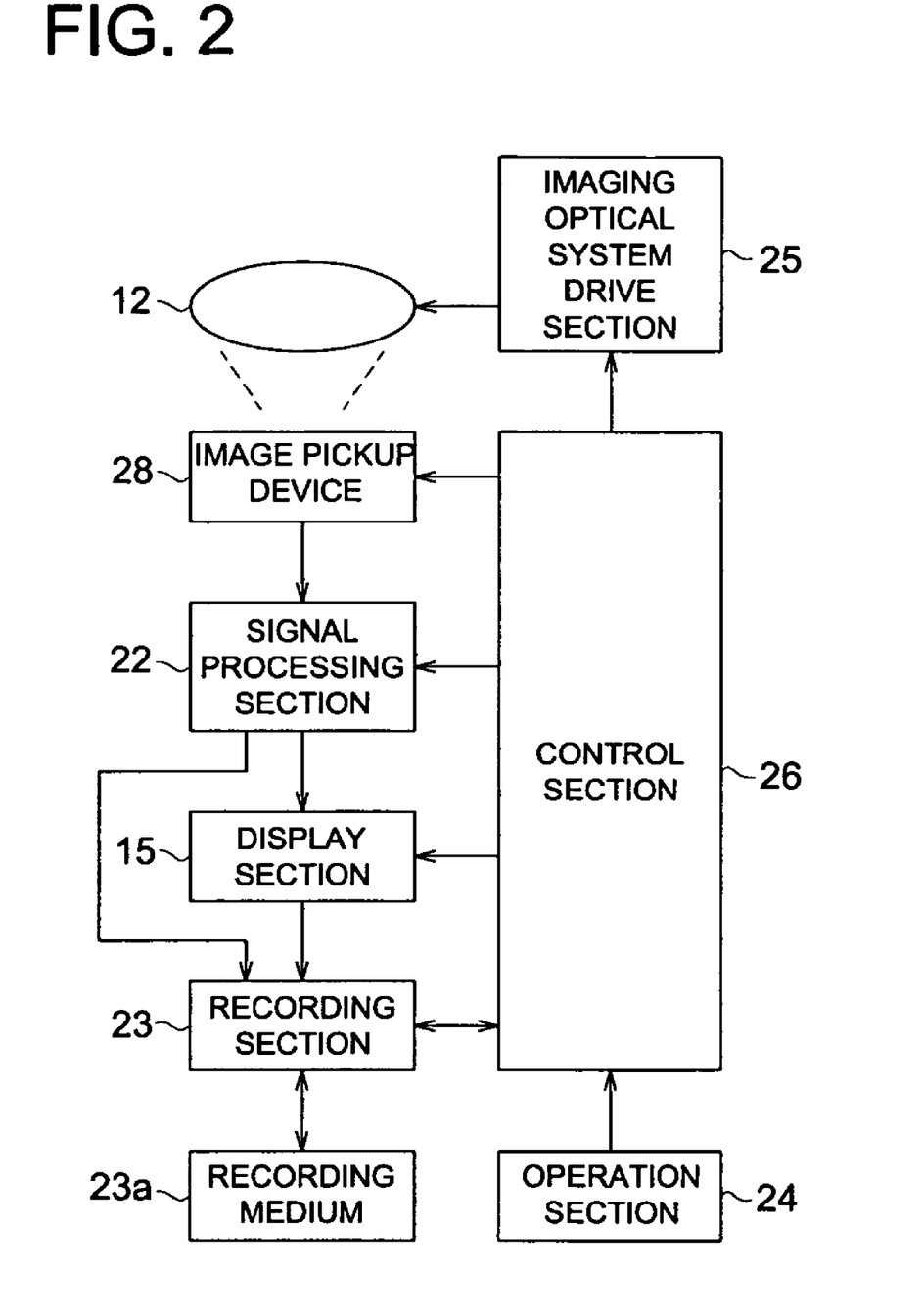
FIG. 2 is a view typically showing the structure of a digital camera of an embodiment of the present invention.

The structure of the digital camera 1 is typically shown in FIG. 2. The digital camera 1 has, other than the imaging optical system 12 and the display section 15, an image pickup device 28, signal processing section 22, recording section 23, operation section 24, imaging optical system drive section 25 and control section 26. The image pickup device 28 is a CCD area sensor and outputs a signal representing the light receiving amount for each pixel. The signal processing section 22 processes the output signal of the image pickup device 28, and generates the image data expressing the picked up image. The recording section 23 records the image data generated by the signal processing section 22 into the detachable recording medium 23a, further, for the reproduction display of the image, reads out the image data from the recording medium 23a. The operation section 24 is a general name of the mode setup switch 16, cross button 17, operation button 18, shutter start button 19, and power button 20, and transmits a signal relating to the operation of the user to the control section 26.

The imaging optical system drive section 25 has a motor and a transmission mechanism for transmitting its drive force to the lens groups of the imaging optical system, and sets the focal distance and the focus position of the imaging optical system 12. The control section 26 controls each section corresponding to the instruction given through the operation section 24.

Next, the structure of the imaging optical system 12 will be described. FIGS. 3 to 6 show an infinite focused condition at a wide angle end focal distance of the imaging optical system of the first to fourth embodiments of the present invention, and the arrow mark shows the position of each lens group at the time of zooming. The base end of the arrow mark corresponds to the wide angle end (W), and the top end corresponds to the telephoto-end (T). Hereupon, FIGS. 3 to 6 are views in which the condition assembled in the digital camera 1 is developed into the plane, and the prism is expressed by the parallel planes and the optical axis is expressed by the straight line.

Figure 3:
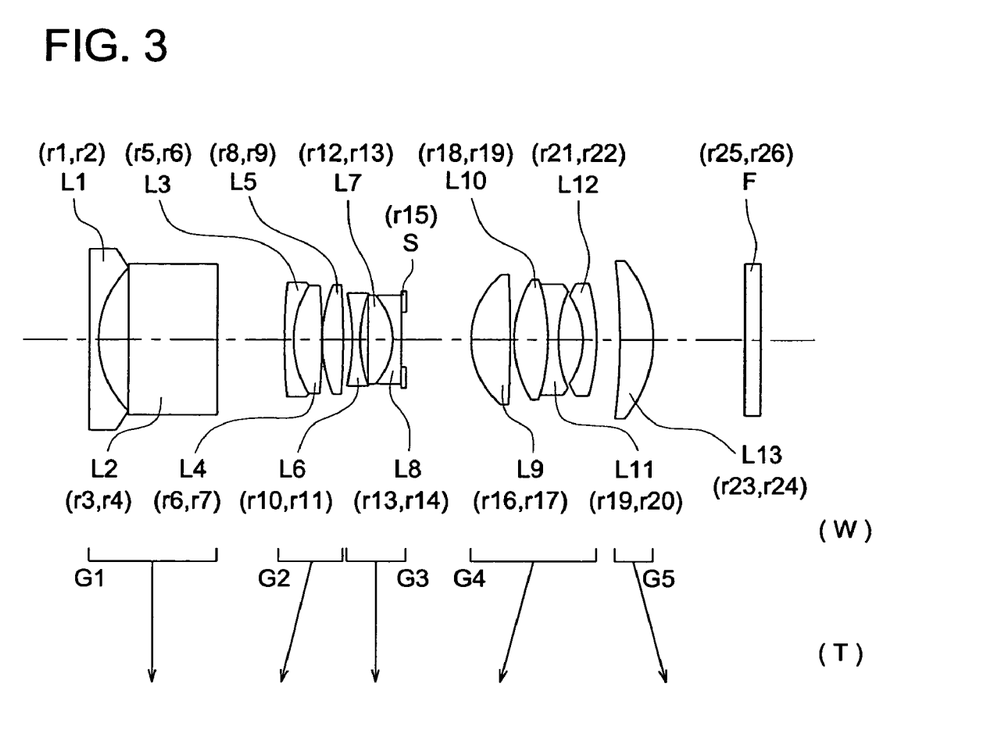
FIG. 3 is a view showing the structure of an imaging optical system of the digital camera of the first embodiment.

The first embodiment is shown in FIG. 3. The imaging optical system in FIG. 3 is comprised of, in order from the object side, the first lens group G1 having negative power, the second lens group G2 having positive power, the third lens group G3 having negative power, aperture stop S, the fourth lens group G4 having positive power, and the fifth lens group G5 having positive power. The parallel plate F equivalent to a cover glass and a low pass filter is in the image side of the imaging optical system. Hereupon, the "power" expresses an amount defined by the inverse number of the focal distance.

The first lens group G1 is comprised of, in order from the object side, a negative meniscus lens L1 whose convex surface is faced the object side, and whose image side surface is aspheric, and a right angled prism L2 expressed by the parallel plate in the view.

The second lens group G2 is comprised of, in order from the object side, the negative meniscus lens L3 whose convex surface is faced the object side, the positive biconvex lens L4 cemented with the lens 3, and the positive biconvex lens L5.

The third lens group G3 is comprised of, in order from the object side, the negative biconcave lens L6, the positive meniscus lens L7 whose concave surface is faced the object side and the negative biconcave lens L8 which is cemented with the lens L7.

The fourth lens group G4 is comprised of, in order from the object side, the positive biconvex lens L9, the positive biconvex lens L10, the negative biconcave lens L11 cemented with the lens L10, and the negative meniscus lens L12 whose concave surface is faced the object side, and whose both surfaces are aspheric.

The fifth lens group G5 is a following lens group, and comprised of the positive meniscus lens L13 whose concave surface is faced object side and whose both surfaces are aspheric.

At the time of zooming from the wide angle end to the telephoto end, the first lens group G1 is fixed with respect to the image plane, the second lens group G2 is moved toward the object side, the third lens group G3 is fixed with respect to the image plane, the fourth lens group G4 and the second lens group G2 are integrally moved toward the object side, and the fifth lens group G5 is moved toward the image side.

At the time of focusing from the infinity to the near distance, the fifth lens group G5 is moved toward the object side, and the other lens groups are fixed with respect to the image plane.

Figure 4:
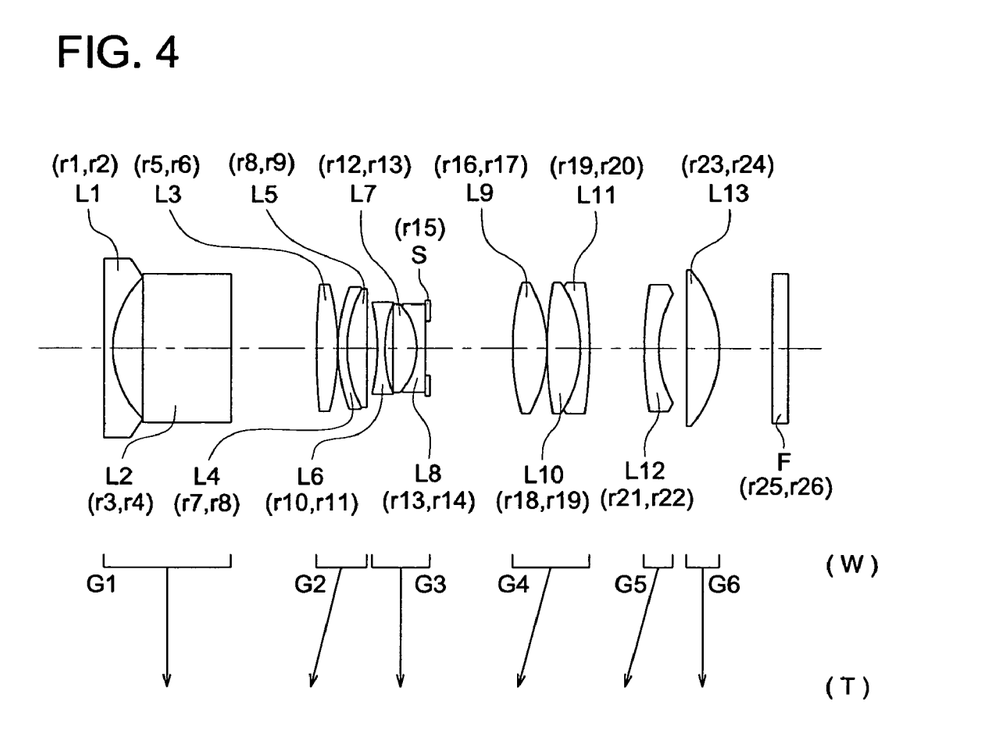
FIG. 4 is a view showing the structure of an imaging optical system of the digital camera of the second embodiment.

The second embodiment is shown in FIG. 4. The imaging optical system of FIG. 4 is comprised of, in order from the object side, the first lens group G1 having negative power, the second lens group G2 having positive power, the third lens group G3 having negative power, aperture stop S, the fourth lens group G4 having positive power, the fifth lens group having negative power and the sixth lens group G6 having positive power. The parallel plate F equivalent to a cover glass and a low pass filter is on the image side of the imaging optical system.

The first lens group G1 is comprised of, in order from the object side, the negative meniscus lens L1 whose convex surface is faced the object side, and whose image side surface is aspheric, and the right angled prism L2 expressed by the parallel plate in the view.

The second lens group G2 is comprised of, in order from the object side, the positive biconvex lens L3, the negative meniscus lens L4 whose convex surface is faced the object side and the positive biconvex lens L5 cemented with the lens L4.

The third lens group G3 is comprised of, in order from the object side, the negative biconcave lens L6, the positive meniscus lens L7 whose concave surface is faced the object side and the negative meniscus lens L8 which is cemented with the lens L7 and whose concave surface is faced the object side.

The fourth lens group G4 is comprised of, in order from the object side, the positive biconvex lens L9 and whose object side surface is aspheric, the positive biconvex lens L10, and the negative meniscus lens L11 which is cemented with the lens L10, whose concave surface is faced the object side.

The fifth lens group G5 is comprised of the negative meniscus lens L12 whose convex surface is faced the object side and whose both surfaces are aspheric.

The sixth lens group G6 is comprised of the positive biconvex lens L13 whose object side surface is aspheric, and constitutes the following lens group together with the fifth lens group G5.

At the time of zooming from the wide angle end to the telephoto end, the first lens group G1 is fixed with respect to the image plane, the second lens group G2 is moved toward the object side, the third lens group G3 is fixed with respect to the image plane, the fourth lens group G4 and the second lens group G2 are integrally moved toward the object side, the fifth lens group G5 is moved toward the object side, and the sixth lens group G6 is fixed with respect to the image plane.

At the time of focusing from the infinity to the near distance, the fifth lens group G5 is moved toward the image side, and the other lens groups are fixed with respect to the image plane.

Figure 5:
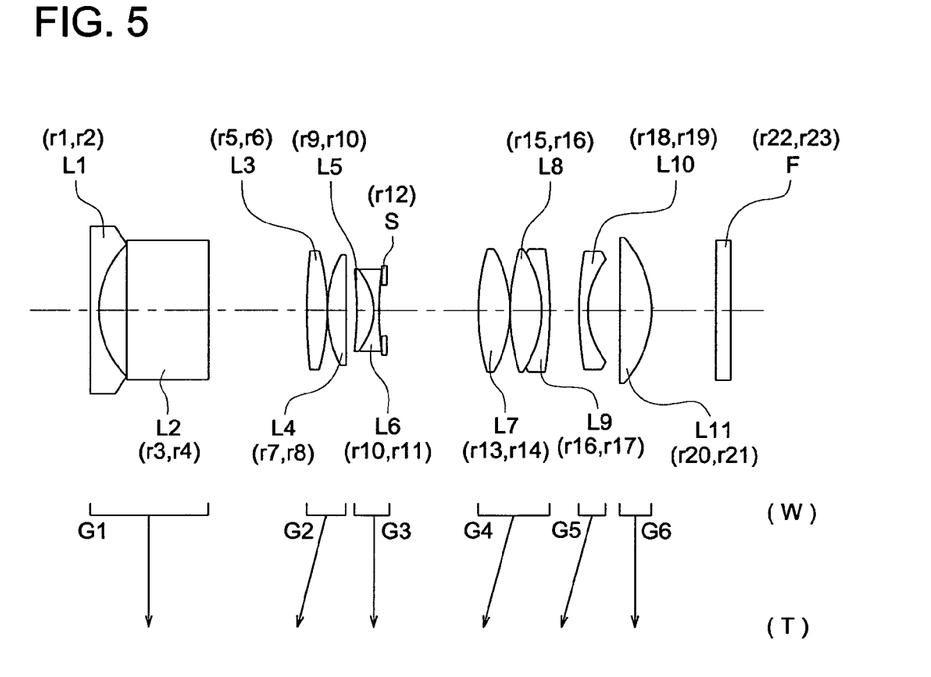
FIG. 5 is a view showing the structure of an imaging optical system of the digital camera of the third embodiment.

The third embodiment is shown in FIG. 5. The imaging optical system of FIG. 5 is comprised of, in order from the object side, the first lens group G1 having negative power, the second lens group G2 having positive power, the third lens group G3 having negative power, aperture stop S, the fourth lens group G4 having positive power, the fifth lens group having negative power, and the sixth lens group G6 having positive power. The parallel plate F equivalent to a cover glass and a low pass filter is on the image side of the imaging optical system.

The first lens group G1 is comprised of, in order from the object side, a negative meniscus lens L1 whose convex surface is faced object side, and whose image side surface is aspheric, and a right angled prism L2 expressed by the parallel plate in the figure.

The second lens group G2 is comprised of, in order from the object side, the positive biconvex lens L3 and the positive meniscus lens L4 whose convex surface is faced the object side.

The third lens group G3 is comprised of, in order from the object side, the positive meniscus lens L5 whose concave surface is faced the object side and the negative meniscus lens L6 which is cemented with the lens L5, whose concave surface is faced the object side.

The fourth lens group G4 is comprised of, in order from the object side, the positive biconvex lens L7, whose object side surface is aspheric, the positive biconvex lens L8 and the negative meniscus lens L9 cemented with the lens L8 and whose concave surface is faced the object side.

The fifth lens group G5 is comprised of the negative meniscus lens L10 whose convex surface is faced the object side, and whose both surfaces are aspheric.

The sixth lens group G6 is comprised of the positive biconvex lens L11 whose both surfaces are aspheric, and constitutes the following lens group together with the fifth lens group G5.

At the time of zooming from the wide angle end to the telephoto end, the first lens group G1 is fixed with respect to the image plane, the second lens group G2 is moved toward the object side, the third lens group G3 is fixed with respect to the image plane, the fourth lens group G4 and the second lens group G2 are integrally moved toward the object side, the fifth lens group G5 is moved toward the object side, and the sixth lens group G6 is fixed with respect to the image plane.

At the time of focusing from the infinity to the near distance, the fifth lens group G5 is moved toward the image side, and the other lens groups are fixed with respect to the image plane.

Figure 6:
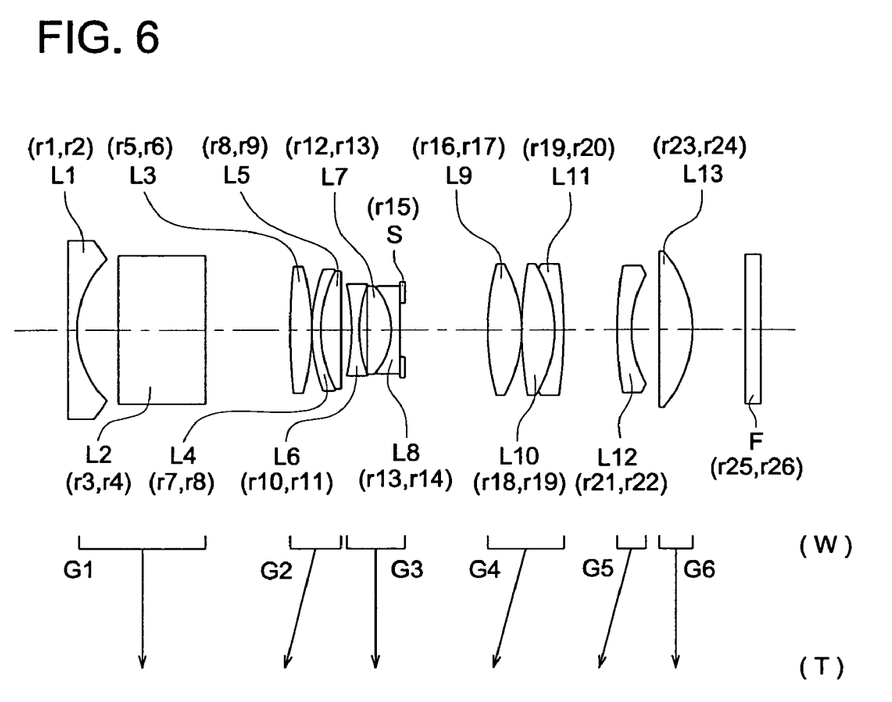
FIG. 6 is a view showing the structure of an imaging optical system of the digital camera of the fourth embodiment.
Figure 7A:
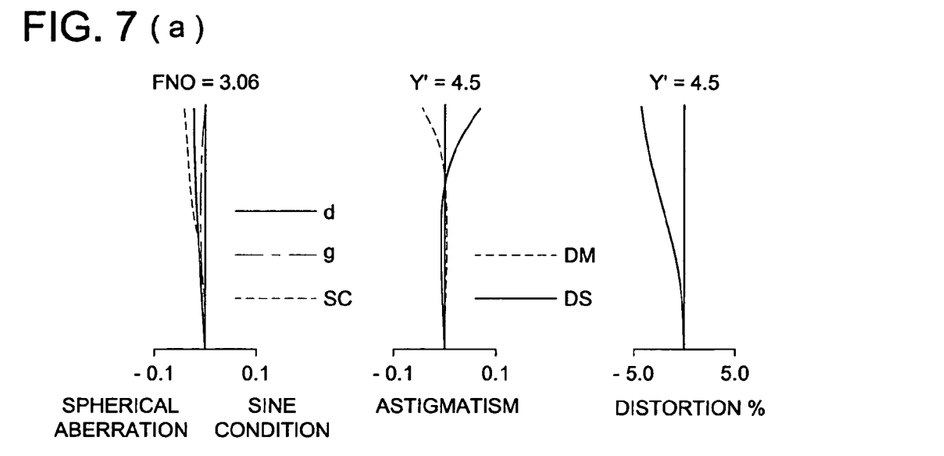
FIG. 7(a) is a view showing the aberration at a wide angle end of the imaging optical system of the digital camera of the first embodiment.
Figure 7B:
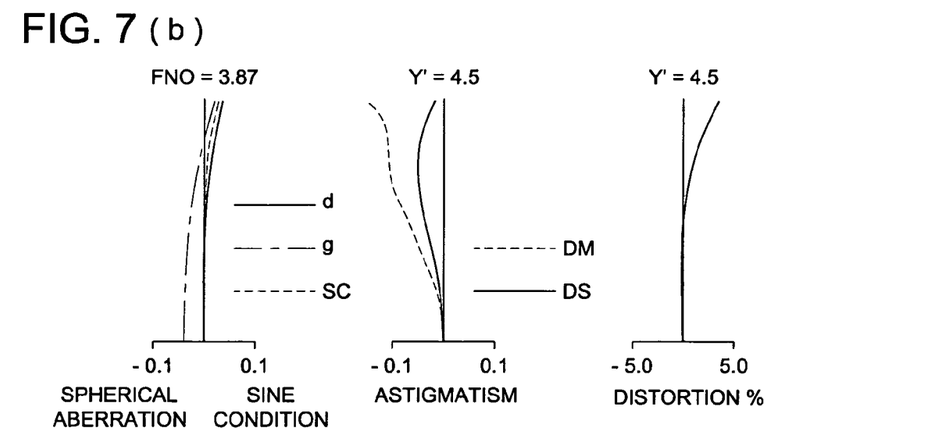
FIG. 7(b) is a view showing the aberration at a middle focal distance of the imaging optical system of the digital camera of the first embodiment.
Figure 7C:
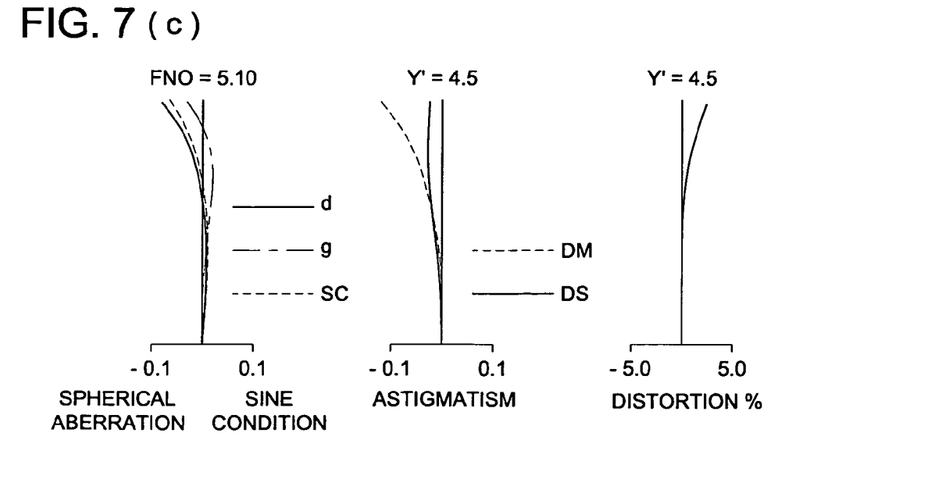
FIG. 7(c) is a view showing the aberration at a telephoto end of the imaging optical system of the digital camera of the first embodiment.
Figure 8:
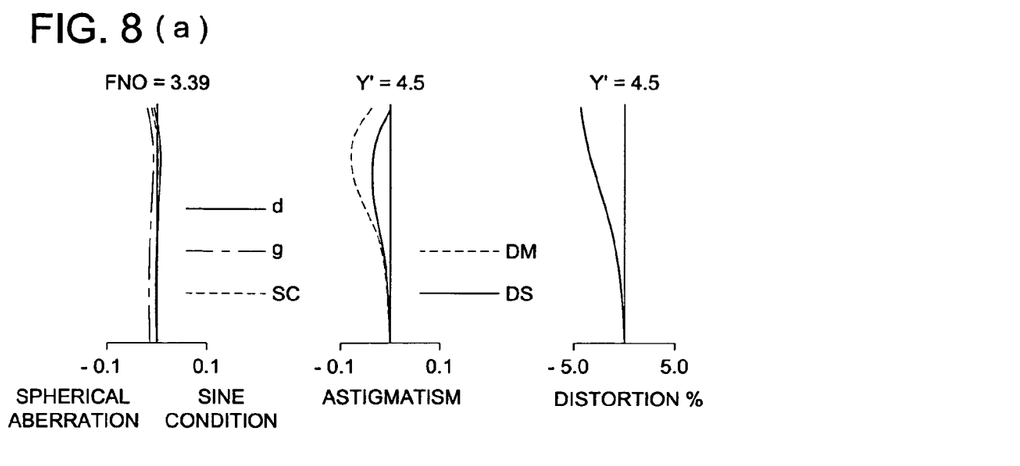
FIG. 8(a) is a view showing the aberration at a wide angle end of the imaging optical system of the digital camera of the second embodiment.
FIG. 8(b) is a view showing the aberration at a middle focal distance of the imaging optical system of the digital camera of the second embodiment.
FIG. 8(c) is a view showing the aberration at a telephoto end of the imaging optical system of the digital camera of the second embodiment.
Figure 9A:
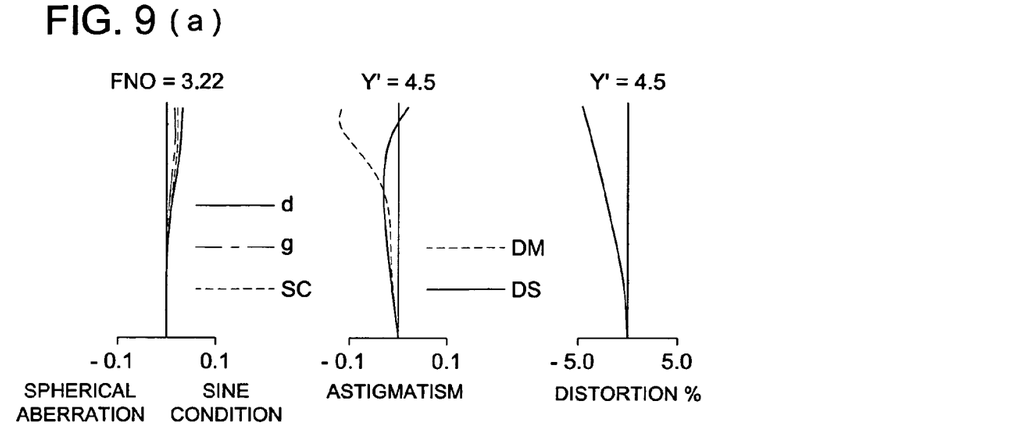
FIG. 9(a) is a view showing the aberration at a wide angle end of the imaging optical system of the digital camera of the third embodiment.
Figure 9B:
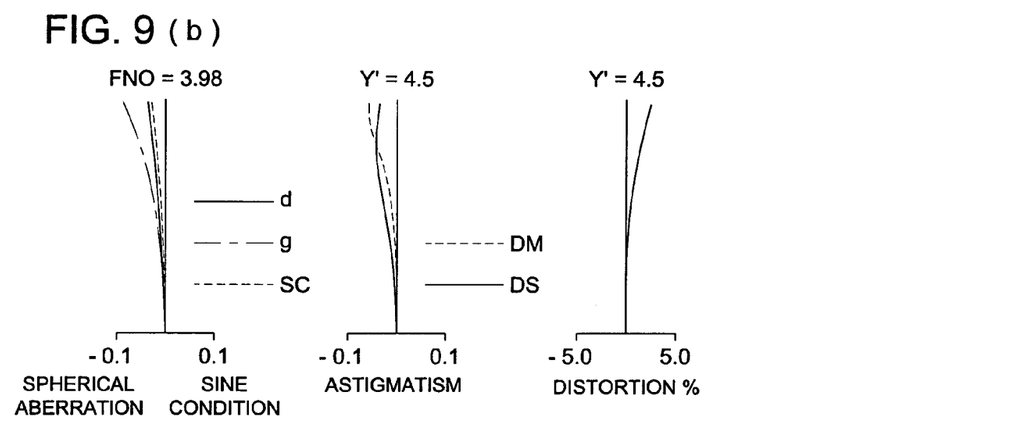
FIG. 9(b) is a view showing the aberration at a middle focal distance of the imaging optical system of the digital camera of the third embodiment.
Figure 9C:
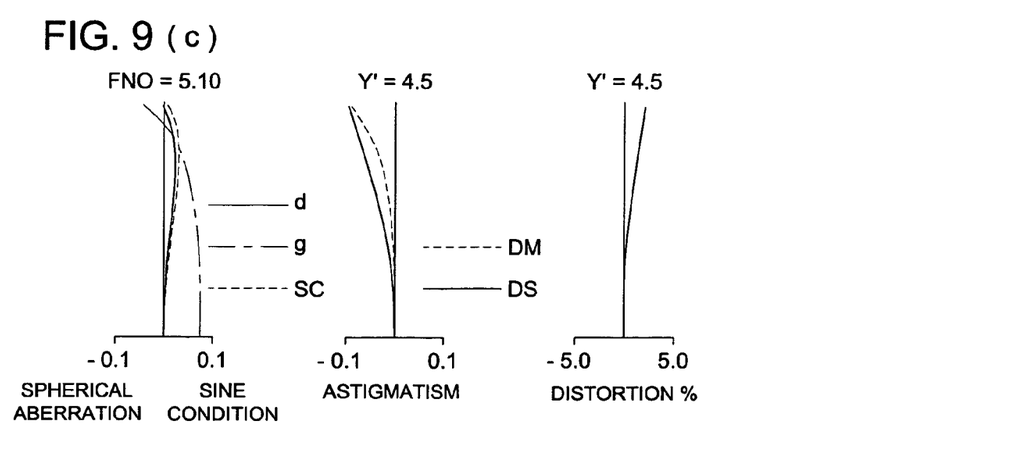
FIG. 9(c) is a view showing the aberration at a telephoto end of the imaging optical system of the digital camera of the third embodiment.
Figure 10A:
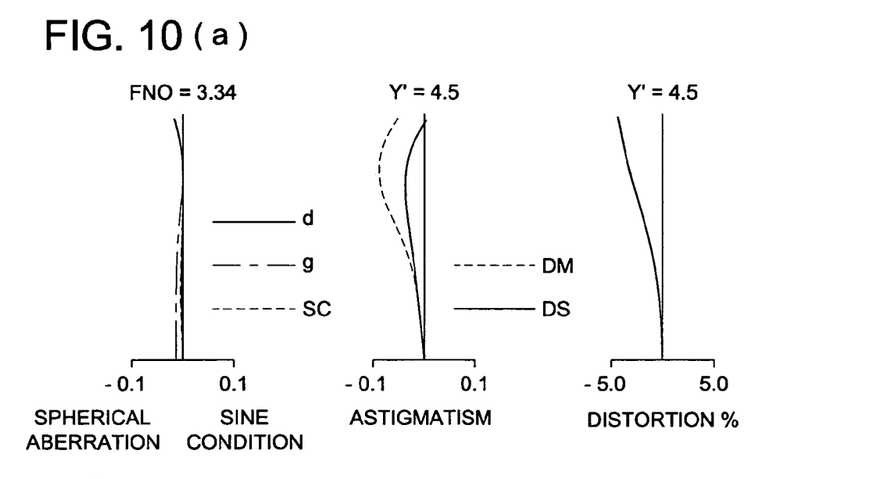
FIG. 10(a) is a view showing the aberration at a wide angle end of the imaging optical system of the digital camera of the fourth embodiment.
Figure 10B:
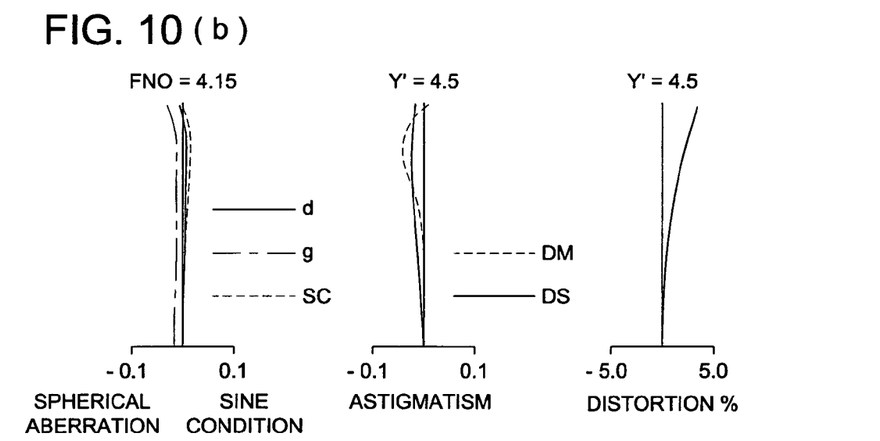
FIG. 10(b) is a view showing the aberration at a middle focal distance of the imaging optical system of the digital camera of the fourth embodiment.
Figure 10C:
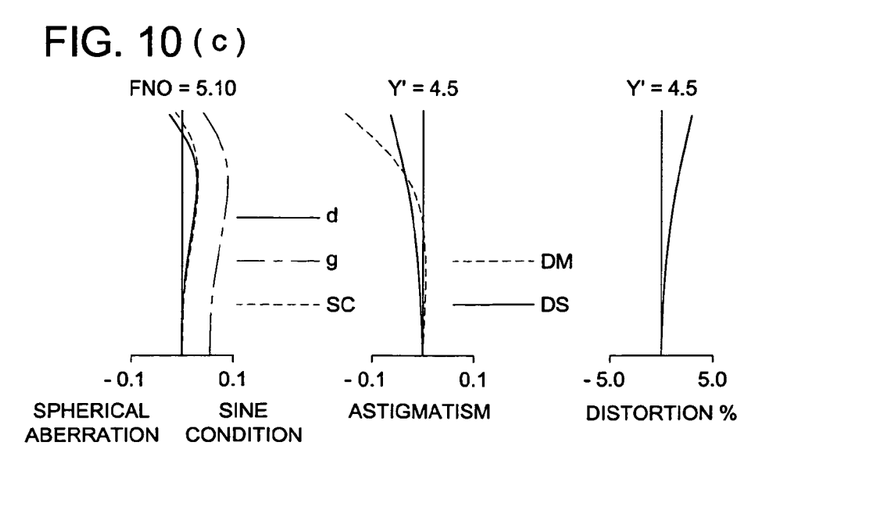
FIG. 10(c) is a view showing the aberration at a telephoto end of the imaging optical system of the digital camera of the fourth embodiment.

The fourth embodiment is shown in FIG. 6. The imaging optical system of FIG. 6 is comprised of, in order from the object side, the first lens group G1 having negative power, the second lens group G2 having positive power, the third lens group G3 having negative power, aperture stop S, the fourth lens group G4 having positive power, the fifth lens group having negative power and the sixth lens group G6 having positive power. The parallel plate F equivalent to a cover glass and a low pass filter is on the image side of the imaging optical system.

The first lens group G1 is comprised of, in order from the object side, a negative meniscus lens L1 whose convex surface is faced object side, and whose image side surface is aspheric, and a right angled prism L2 expressed by the parallel plate in the view.

The second lens group G2 is comprised of, in order from the object side, the positive biconvex lens L3, the positive meniscus lens L4 whose convex surface is faced the object side and the positive biconvex lens L5 cemented with the lens L4.

The third lens group G3 is comprised of, in order from the object side, the negative biconcave lens L6, the positive meniscus lens L7 whose concave surface is faced the object side and the negative-meniscus lens L8 which is cemented with the lens L7, whose concave surface is faced the object side.

The fourth lens group G4 is comprised of, in order from the object side, the positive biconvex lens L9 whose object side surface is aspheric, the positive biconvex lens L10, and the negative meniscus lens L11 cemented with the lens L10, whose concave surface is faced the object side.

The fifth lens group G5 is comprised of the negative meniscus lens L12 whose convex surface is faced the object side, and whose both surfaces are aspheric.

The sixth lens group G6 is comprised of the positive biconvex lens L13 whose object side surface is aspheric, and constitutes the following lens group together with the fifth lens group G5.

At the time of zooming from the wide angle end to the telephoto end, the first lens group G1 is fixed with respect to the image plane, the second lens group G2 is moved toward the object side, the third lens group G3 is fixed with respect to the image plane, the fourth lens group G4 and the second lens group G2 are integrally moved toward the object side, the fifth lens group G5 is moved toward the object side, and the sixth lens group G6 is fixed with respect to the image plane.

At the time of focusing from the infinity to the near distance, the fifth lens group G5 is moved toward the image side, and the other lens groups are fixed with respect to the image plane.

The imaging optical system of each embodiment, described hitherto, has, in order from the object side, the first lens group having negative power, the second lens group having positive power, the third lens group having negative power, the fourth lens group having positive power, and the following lens groups, and has the structure in which, during zooming, the first lens group is fixed with respect to the image plane, and the moving lens group constituting the following lens group is moved.

When this structure is applied, the spatial margin of the movement of the moving lens group which is moved during zooming can be secured, the angle of view of the wide angle end of the imaging optical system can be made large, further, the fine aberration can be obtained from the wide angle end to the telephoto end, and the size in the optical axis direction of the total system in the range from the wide angle end to the telephoto end becomes small.

Further, each embodiment has the structure that satisfies the following relationship.

$$0.2 < MGB/(fw \times ft)^{1/2} < 1.5 \qquad \text{relationship 1}$$

$$LB/y < 0.8 \qquad \text{relationship 2}$$

Hereupon, MGB is a movement amount, from the wide angle end to the telephoto end, of the moving lens group in the following lens group, fw is the focal distance of the total system at the wide angle end, ft is the focal distance of the total system at the telephoto end, LB is the distance between the most image side surface of the following lens group and the image plane which is the minimum value over a full zooming range, and y is the diagonal length of the image pickup device.

The relationship 1 is one for regulating the movement amount of the moving lens group, when the moving lens group moves during zooming from the intermediate focal length to the wide angle end and the telephoto end of the total optical system, within an adequate range, and for securing the zoom ratio, and for correcting the aberration finely. When a value of a conditional expression MGB/(fw× ft)$^{1/2}$ is lower than the lower limit of the relationship 1, the movement amount of the moving lens group during zooming becomes too small, and enough zoom ratio can not be secured, further, the movement amount of the other lens group during zooming becomes large, thus there will be no other choice but to extend the total length in the optical axis direction. Inversely, when the value of MGB/(fw×ft)$^{1/2}$ is larger than the upper limit of the relationship 1, the movement amount of the moving lens group during zooming becomes too large, and the off-axial aberration such as the coma or astigmatism becomes large, and the performance of the image plane periphery is deteriorated.

It is more preferable when the relationship 1' is satisfied instead of the relationship 1.

$$0.4 < MGB/(fw \times ft)^{1/2} < 1 \qquad \text{relationship 1'}$$

The relationship 2 regulates the ratio, which is the minimum over the full zooming range, of the distance between the most image side surface of the following lens group and the image plane to the diagonal length of the image pick-up device within the adequate range. When a value of the expression LB/y is larger than the upper limit of the relationship 2, because the distance between the most image side surface of the following lens group and the image plane becomes large, the total size becomes large.

Further, because it is a structure in which together with the moving lens group of the following lens group, the second lens group and the fourth lens group are integrally moved during zooming, the variation of aberration with the zooming can be suppressed small. Further, the second lens group and the fourth lens group are integrally moved together with the moving lens group during zooming, and the moving lens group is moved during focusing, thus, because the moving lens group are commonly used for the movement of both focusing and zooming, the drive mechanism of the lens group can be made simple, and the small-sized imaging apparatus is attained.

Further, it is more preferable when the following relationship of the relationship 3 is satisfied.

$$0.4<|(1-\beta GB^2)\times\beta GR^2|<3 \qquad \text{relationship 3}$$

Hereupon, βGB is a magnification ratio of the moving lens group when the focal distance of the total system is $(fw\times ft)^{1/2}$, βGR is a magnification ratio of the lens group arranged on the more image side than the moving lens group. Hereupon, when a lens group is not arranged on the more image side than the moving lens group, βGR is 1.

The relationship 3 is one for regulating the magnification ratio of the moving lens group and the lens group on its image side within the adequate range, and for balancing the movement amount of a focal plane around the image plane at the time of focusing and the aberration correction. When a value of a conditional expression $|(1-\beta GB^2)\times\beta GR^2|$ is lower than the lower limit of the relationship 3, the movement amount of the moving lens group necessary for the focusing becomes too large, and the aberration correction becomes difficult. Inversely, when a value of $|(1-\beta GB^2)\times\beta GR^2|$ is larger than the upper limit of the relationship 3, the movement amount of the focal plane around the image plane with respect to the unit movement amount of the moving lens at the time of focusing becomes too large, and it becomes difficult that the drive mechanism of the lens group is structured.

It is more preferable when the relationship 3' is satisfied instead of the relationship 3.

$$0.4<|(1-\beta GB^2)\times\beta GR^2|<2.5 \qquad \text{relationship 3'}$$

Further, when it is structured such that the third lens group is fixed with respect to the image plane during zooming and the focusing, the drive mechanism of the lens group during focusing and zooming can be made simple, and the small-sized imaging apparatus is attained.

Further, when the third lens group is structured such that it is moved in a surface perpendicular to the optical axis, in the third lens group, the optical axis perpendicular dislocation sensitivity in the image plane to the perpendicular dislocation of the optical axis of the lens is large, further, because the deterioration sensitivity of the off-axial performance is small, even when blurring correction is conducted in the third lens group, the deterioration of the off-axial aberration is small, and fine picturing performance is obtained. Further, because the effective diameter of the third lens group is small, even when the blurring correction mechanism is arranged at the periphery of the third lens group, the apparatus is not made large size, and the drive output of the blurring correction mechanism is small, and the power consumption can be reduced.

Further, when the first lens group is structured such that it has the reflection optical member for bending the optical axis about perpendicularly, the imaging apparatus can be made small in the object direction.

Further, when the moving lens group is composed of single lens, the drive output of the drive mechanism during zooming or focusing is small, and the power consumption can be reduced.

When the moving lens group is structured such that it has at least one aspheric surface, the aberration variation following the focusing can be suppressed small.

Further, the aperture stop is arranged between the second lens group and the third lens group, or the third lens group and the fourth lens group, and when the aperture stop is structured so that it is fixed with respect to the image plane, the off-axial aberration can be finely corrected, and the total system can be made small.

When the first lens group has the lens, and the lens is composed of single negative lens, while the aberration performance is maintained well, the production cost can be made low.

Hereupon, the imaging optical system 12 may be arranged in the horizontal direction or in the vertical direction to the casing 10 of the digital camera 1. When the imaging optical system 12 is arranged in the vertical direction, the length of the prism in the optical axis direction becomes smaller, and the imaging optical system 12 can be made small size.

According to the embodiments of the present invention, the imaging optical system of a small-sized and the wide angle of view zoom lens, in which the aberration is finely corrected, and a small-sized imaging apparatus can be provided. The embodiments of the present invention employ the following construction. The imaging optical system has, in order from the object side, the first lens group of negative power, the second lens group of positive power, the third lens group of negative power, the fourth lens group of positive power, and the following lens group, and the first lens group is fixed with respect to the image plane during zooming and the focusing, and during zooming at least a part of lens group of the following lens group is moved in an adequate range while the distance between the most image side surface of the following lens group and the image plane is set in a adequate range.

Further, in above-described each embodiment, an example of digital camera which takes the still image is described, however, the imaging optical system of the present invention can also be adopted for a camera assembled in an information processing device such as a digital video camera for taking the moving image, mobile computer, cell phone, and portable information terminal.

EXAMPLES

The structure of the imaging optical system included in the imaging apparatus on which the present invention is conducted, will be further specifically described, by listing the construction data of Table 1 to Table 8, aberration views of FIG. 7(a) to FIG. 10(c). Example 1 to Example 4 described as the example herein, respectively corresponds to the first to the fourth embodiment. The lens composition view (FIG. 3 to 6) expressing the first to the fourth embodiment respectively shows the lens structure of corresponding example 1 to 4.

In the construction data of Table 1 to 8, the radius of curvature is shown by r, the number is attached to in order from the object side, the axial distance is shown by d, and the axial distance from the object side is expressed in order from the top of the Table. For the axial distance changed by the zooming, values of focal distance of the wide angle end, the middle and the telephoto end are expressed in order from the left. The refractive index, Abbe number, are shown by N, ν, and the refractive index, Abbe number from the object side are shown in order from the top of the Table. Further, the refractive index and the Abbe number are values for d-line, and the refractive index and the Abbe number are neglected for the air. Hereupon, for the aspheric surface, asterisk (*mark) is attached to the front of the surface number. The image pickup device is arranged on the back of the final surface. The focal distance (f) of the total system is shown at the wide angle end, the middle focal distance, and at the telephoto end, and F-number (Fno) in each focal distance is shown together with other data. The unit of the focal distance, radius of curvature, axial distance is mm.

The aspheric surface is defined by the following.

$$X(H)=C \cdot H^2/\{1+(1-\epsilon \cdot C^2 \cdot H^2)^{1/2}\}+\Sigma AK \cdot Hk \quad \text{Expression 1}$$

Herein, H is a height in the direction perpendicular to the optical axis, X(H) is a dislocation amount (surface vertex reference) of the optical axis direction at the position of height H, C is a paraxial curvature, $\epsilon$ is a quadratic curved surface parameter, k is the order of the aspheric surface, AK is an aspheric surface coefficient of k-th order, Hk is k-th power of H. Character E attached to Table 2, 4, 6, 8 expresses the exponential part of the corresponding numeral, for example, when it is 1.0E-02, it shows $1.0 \times 10^{-2}$.

For aberration view of FIG. 7(a) to FIG. 10(c), it shows each aberration at the wide angle end, the middle and the telephoto end. The line-d of the spherical aberration expresses the aberration for d-line, line-g expresses the aberration for g-line and line SC expresses the amount of failure in meeting the sine condition. Further, the line DM and the line DS of the astigmatism are aberration on respectively the meridional surface and the sagittal surface. Unit is percentage only for a horizontal axis of distortion, and for other axes, all mm. Further, Y'=4.5 mm corresponds to the image pickup device (1.8 inch type) of the diagonal length 9 mm.

Values of each example corresponding to the conditional expression are shown in Table 9, and each example satisfies all the conditional expressions.

Aspheric Surface Data

TABLE 2

| | r2 |
|---|---|
| $\epsilon$ | 1.00000E+00 |
| A4 | −2.88255E−04 |
| A6 | −1.06414E−05 |
| A8 | 6.20452E−08 |
| A10 | −7.12889E−09 |
| | r21 |
| $\epsilon$ | 1.00000E+00 |
| A4 | −4.05554E−03 |
| A6 | −2.25944E−04 |
| A8 | 4.54272E−06 |
| | r22 |
| $\epsilon$ | 1.00000E+00 |
| A4 | −1.96052E−03 |
| A6 | −1.03778E−04 |
| A8 | 8.69279E−06 |
| | r23 |
| $\epsilon$ | 1.00000E+00 |
| A4 | −2.40350E−04 |
| A6 | −2.11726E−06 |
| A8 | −4.69096E−08 |
| | r24 |
| $\epsilon$ | 1.00000E+00 |
| A4 | −1.47306E−04 |
| A6 | 9.31509E−06 |
| A8 | −1.54722E−07 |

Example 1

TABLE 1 f = 5.944-10.046-16.941
Fno = 3.063-3.869-5.1

| Surface No. | Radius of curvature (r) | Axial distance (d) | Refractive index (N) | Abbe number (ν) |
|---|---|---|---|---|
| 1 | 66.416 | 0.700 | 1.77250 | 49.36 |
| *2 | 6.189 | 2.077 | | |
| 3 | ∞ | 6.440-1.84666-23.78 | | |
| 4 | ∞ | 4.670 | 2.453 | 0.500 |
| 5 | 57.135 | 0.600 | 1.80518 | 25.46 |
| 6 | 7.043 | 2.031 | 1.65844 | 50.84 |
| 7 | −30.603 | 0.100 | | |
| 8 | 11.638 | 1.469 | 1.88300 | 40.80 |
| 9 | −28.975 | 0.579-2.796-4.749 | | |
| 10 | −19.796 | 0.600 | 1.88300 | 40.80 |
| 11 | 10.258 | 0.567 | | |
| 12 | −136.947 | 1.569 | 1.84666 | 23.78 |
| 13 | −4.812 | 0.600 | 1.74400 | 44.90 |
| 14 | 90.752 | 0.338 | | |
| 15 | ∞ | 4.762-2.544-0.592 | | |
| 16 | 6.640 | 2.611 | 1.58913 | 61.24 |
| 17 | −40.050 | 0.300 | | |
| 18 | 8.147 | 2.467 | 1.49700 | 81.61 |
| 19 | −11.949 | 0.600 | 1.84666 | 23.78 |
| 20 | 8.988 | 1.788 | | |
| *21 | −16.753 | 1.000 | 1.58400 | 31.00 |
| *22 | −28.732 | 1.622-6.153-10.915 | | |
| *23 | −4114.615 | 2.287 | 1.53048 | 55.72 |
| *24 | −9.023 | 6.623-4.309-1.5 | | |
| 25 | ∞ | 1.100 | 1.51680 | 64.20 |
| 26 | ∞ | | | |

Example 2

TABLE 3 f = 5.944-10.046-16.941
Fno = 3.391-4.189-5.1

| Surface No. | Radius of curvature (r) | Axial distance (d) | Refractive index (N) | Abbe number (ν) |
|---|---|---|---|---|
| 1 | 229.806 | 0.700 | 1.77250 | 49.36 |
| *2 | 6.778 | 2.135 | | |
| 3 | ∞ | 6.500 | 1.84666 | 23.78 |
| 4 | ∞ | 5.51-3.162-0.5 | | |
| 5 | 33.843 | 1.418 | 1.49700 | 81.61 |
| 6 | −16.373 | 0.100 | | |
| 7 | 12.132 | 0.600 | 1.84666 | 23.78 |
| 8 | 7.156 | 1.735 | 1.88300 | 40.80 |
| 9 | −2996.718 | 0.624-2.973-5.635 | | |
| 10 | −22.565 | 0.600 | 1.88300 | 40.80 |
| 11 | 12.154 | 0.457 | | |
| 12 | −61.674 | 1.246 | 1.84666 | 23.78 |
| 13 | −5.268 | 0.600 | 1.88300 | 40.80 |
| 14 | −144.617 | 0.300 | | |
| 15 | ∞ | 5.882-3.534-0.872 | | |
| *16 | 13.365 | 2.358 | 1.58913 | 61.24 |
| 17 | −9.246 | 0.100 | | |
| 18 | 21.588 | 2.209 | 1.49700 | 81.61 |
| 19 | −8.786 | 0.600 | 1.84666 | 23.78 |
| 20 | −57.721 | 3.854-2.145-1.5 | | |
| *21 | 64.262 | 0.866 | 1.60280 | 28.30 |
| *22 | 7.989 | 1.916-5.973-9.28 | | |
| *23 | 66.320 | 2.210 | 1.60280 | 28.30 |
| 24 | −11.931 | 3.879 | | |
| 25 | ∞ | 1.100 | 1.51680 | 64.20 |
| 26 | ∞ | | | |

Aspheric Surface Data

TABLE 4 r2

| | |
|---|---|
| ε | 1.00000E+00 |
| A4 | −3.19946E−04 |
| A6 | −5.88319E−06 |
| A8 | 4.51498E−08 |
| A10 | −4.01970E−09 | r16

| | |
|---|---|
| ε | 1.00000E+00 |
| A4 | −3.00499E−04 |
| A6 | −4.55811E−06 |
| A8 | 3.99360E−07 |
| A10 | −1.25251E−08 | r21

| | |
|---|---|
| ε | 1.00000E+00 |
| A4 | 1.24801E−04 |
| A6 | 1.72332E−05 |
| A8 | 1.78258E−07 | r22

| | |
|---|---|
| ε | 1.00000E+00 |
| A4 | 4.33081E−04 |
| A6 | 1.12608E−05 |
| A8 | 5.26850E−07 | r23

| | |
|---|---|
| ε | 1.00000E+00 |
| A4 | −7.58543E−05 |
| A6 | 1.57758E−06 |
| A8 | −1.20798E−08 |

Example 3

TABLE 5 f = 5.944-10.046-17.832
Fno = 3.22-3.978-5.097

| Surface No. | Radius of curvature (r) | Axial distance (d) | Refractive index (N) | Abbe number (ν) |
|---|---|---|---|---|
| 1 | 805.689 | 0.700 | 1.77250 | 49.36 |
| *2 | 6.999 | 2.014 | | |
| 3 | ∞ | 6.500 | 1.84666 | 23.78 |
| 4 | ∞ | 6.508-3.786-0.5 | | |
| 5 | 38.155 | 1.568 | 1.49700 | 81.61 |
| 6 | −13.756 | 0.100 | | |
| 7 | 9.744 | 1.448 | 1.58913 | 61.24 |
| 8 | 728.675 | 0.666-3.388-6.674 | | |
| 9 | −27.402 | 1.158 | 1.84666 | 23.78 |
| 10 | −6.435 | 0.600 | 1.88300 | 40.80 |
| 11 | 12.867 | 0.558 | | |
| 12 | ∞ | 6.873-4.151-0.865 | | |
| *13 | 14.229 | 2.089 | 1.58913 | 61.24 |
| 14 | −11.682 | 0.300 | | |
| 15 | 11.736 | 2.422 | 1.49700 | 81.61 |
| 16 | −10.612 | 0.688 | 1.84666 | 23.78 |
| 17 | −49.300 | 1.986-1.22-1.685 | | |
| *18 | 40.057 | 0.600 | 1.60280 | 28.30 |
| *19 | 5.413 | 2.428-5.916-8.737 | | |
| *20 | 382.466 | 2.377 | 1.60280 | 28.30 |
| *21 | −9.732 | 4.818 | | |
| 22 | ∞ | 1.100 | 1.51680 | 64.20 |
| 23 | ∞ | | | |

Aspheric Surface Data

TABLE 6 r2

| | |
|---|---|
| ε | 1.00000E+00 |
| A4 | −2.65539E−04 |
| A6 | −3.71485E−06 |
| A8 | −7.13538E−08 |
| A10 | −5.84592E−10 | r13

| | |
|---|---|
| ε | 1.00000E+00 |
| A4 | −2.08802E−04 |
| A6 | −5.01986E−06 |
| A8 | 6.01192E−07 |
| A10 | −1.88329E−08 | r18

| | |
|---|---|
| ε | 1.00000E+00 |
| A4 | 7.82520E−04 |
| A6 | −1.03934E−04 |
| A8 | 3.86834E−06 |
| A10 | −1.27300E−08 | r19

| | |
|---|---|
| ε | 1.00000E+00 |
| A4 | 9.39722E−04 |
| A6 | −1.26571E−04 |
| A8 | 2.34150E−06 |
| A10 | 5.29475E−08 | r20

| | |
|---|---|
| ε | 1.00000E+00 |
| A4 | −1.46721E−05 |
| A6 | 5.27040E−07 |
| A8 | −1.11171E−08 | r21

| | |
|---|---|
| ε | 1.00000E+00 |
| A4 | 3.61472E−05 |
| A6 | −1.40651E−07 |
| A8 | 4.94206E−09 |

Example 4

TABLE 7 f = 5.944-10.046-17.832
Fno = 3.341-4.152-5.1

| Surface No. | Radius of curvature (r) | Axial distance (d) | Refractive index (N) | Abbe number (ν) |
|---|---|---|---|---|
| 1 | 351.165 | 0.700 | 1.77250 | 49.36 |
| *2 | 6.797 | 2.565 | | |
| 3 | ∞ | 6.546 | 1.84666 | 23.78 |
| 4 | ∞ | 5.722-3.435-0.5 | | |
| 5 | 40.391 | 1.447 | 1.49700 | 81.61 |
| 6 | −15.211 | 0.100 | | |
| 7 | 12.740 | 0.600 | 1.84666 | 23.78 |
| 8 | 7.254 | 1.743 | 1.88300 | 40.80 |
| 9 | −294.605 | 0.637-2.924-5.859 | | |
| 10 | −20.503 | 0.600 | 1.88300 | 40.80 |
| 11 | 13.040 | 0.441 | | |
| 12 | −88.155 | 1.315 | 1.84666 | 23.78 |
| 13 | −5.268 | 0.600 | 1.88300 | 40.80 |
| 14 | −3386.970 | 0.300 | | |
| 15 | ∞ | 6.115-3.828-0.893 | | |
| *16 | 17.803 | 2.210 | 1.58913 | 61.24 |
| 17 | −9.353 | 0.100 | | |
| 18 | 20.547 | 2.283 | 1.49700 | 81.61 |
| 19 | −8.786 | 0.600 | 1.84666 | 23.78 |
| 20 | −46.224 | 5.357 | 2.939 | 1.500 |

TABLE 7-continued f = 5.944-10.046-17.832
Fno = 3.341-4.152-5.1

| Surface No. | Radius of curvature (r) | Axial distance (d) | Refractive index (N) | Abbe number (v) |
|---|---|---|---|---|
| *21 | 30.062 | 0.850 | 1.60280 | 28.30 |
| *22 | 7.837 | 1.969-6.674-11.048 | | |
| *23 | 164.680 | 2.198 | 1.60280 | 28.30 |
| 24 | −11.057 | 3.401 | | |
| 25 | ∞ | 1.100 | 1.51680 | 64.20 |
| 26 | ∞ | | | |

Aspheric Surface Data

TABLE 8

| | r2 |
|---|---|
| $\epsilon$ | 1.00000E+00 |
| A4 | −3.10989E−04 |
| A6 | −5.45204E−06 |
| A8 | 3.83127E−08 |
| A10 | −3.88721E−09 |
| | r16 |
| $\epsilon$ | 1.00000E+00 |
| A4 | −1.94994E−04 |
| A6 | −4.16737E−06 |
| A8 | 4.03009E−07 |
| A10 | −1.22878E−08 |
| | r21 |
| $\epsilon$ | 1.00000E+00 |
| A4 | 3.50328E−04 |
| A6 | 2.04760E−06 |
| A8 | 3.61188E−07 |
| | r22 |
| $\epsilon$ | 1.00000E+00 |
| A4 | 6.13304E−04 |
| A6 | −1.91427E−06 |
| A8 | 7.48724E−07 |
| | r23 |
| $\epsilon$ | 1.00000E+00 |
| A4 | −1.44805E−04 |
| A6 | 1.40616E−06 |
| A8 | −6.15318E−09 |

Conditional Expression Corresponding Value

TABLE 9

| | $MGB/(fw \times ft)^{1/2}$ | $LB/y$ | $|(1 - \beta GB^2) \times \beta GR^2|$ |
|---|---|---|---|
| Example 1 | 0.511 | 0.303 | 0.544 |
| Example 2 | 0.734 | 0.567 | 1.372 |
| Example 3 | 0.613 | 0.671 | 2.279 |
| Example 4 | 0.882 | 0.514 | 1.189 |

What is claimed is:

1. An imaging optical system for imaging light from an object side on an image pickup device, comprising in order from the object side:
a first lens group with negative power, which is fixed with respect to an image plane during focusing and zooming;
a second lens group with positive power;
a third lens group with negative power;
a fourth lens group with positive power; and
a following lens group,
wherein at least a moving lens group constituting the following lens group moves during zooming, and a movement distance MGB of the moving lens group from a wide angle end to a telephoto end, an overall focal length fw at the wide angle end, an over all focal length ft at the telephoto end, a distance LB between the most image side surface and the image plane which is minimum over a full zooming range and a diagonal length y of the image pickup device satisfy the following relationships:

$$0.2 < MGB/(fw \times ft)^{1/2} < 1.5$$

$$LB/y < 0.8.$$

2. The imaging optical system of claim 1, wherein the second lens group and the fourth lens group move integrally during zooming, the moving lens group of the following lens group moves during focusing, and a magnification ratio $\beta GB$ of the moving lens group when the overall focal length is $(fw \times ft)^{1/2}$ and a magnification ratio $\beta GR$ of a lens group located on the image side of the moving lens group satisfy the following relationship:

$$0.4 < |(1-\beta GB^2) \times \beta GR^2| < 3.$$

3. The imaging optical system of claim 1, wherein the third lens group is fixed with respect to the image plane during zooming and focusing.

4. The imaging optical system of claim 3, wherein the third lens group moves in a plane perpendicular to an optical axis of the imaging optical system to correct shaking.

5. The imaging optical system of claim 1, wherein the first lens group comprises a reflecting optical member for bending an optical axis at substantially right angle.

6. The imaging optical system of claim 1, wherein the moving lens group consists of a single lens.

7. The imaging optical system of claim 1, wherein the moving lens group comprises at least one aspherical surface.

8. The imaging optical system of claim 1, comprising:
an aperture stop, which is fixed with respect to the image plane, between the second lens group and the third lens group or the third lens group and the fourth lens group.

9. The imaging optical system of claim 1, wherein the first lens group comprises a single lens, which has negative power.

10. The imaging optical system of claim 1, wherein the second lens group and the fourth lens group move integrally during zooming, the moving lens group of the following lens group moves during focusing, and a magnification ratio $\beta GB$ of the moving lens group when the overall focal length is $(fw \times ft)^{1/2}$ and a magnification ratio $\beta GR$ of a lens group located on the image side of the moving lens group satisfy the following relationship:

$$0.4 < |(1-\beta GB^2) \times \beta GR^2| < 2.5.$$

11. The imaging optical system of claim 1, comprising:
an aperture stop, which is fixed with respect to the image plane, between the second lens group and the third lens group or the third lens group and the fourth lens group,
wherein a magnification ratio $\beta GB$ of the moving lens group when the overall focal length is $(fw \times ft)^{1/2}$ and a magnification ratio βGR of a lens group located on the image side of the moving lens group satisfy the following relationship:

$$0.4<|(1-\beta GB^2)\times\beta GR^2|<3.$$

12. The imaging optical system of claim 1, wherein the first lens group comprises a reflecting optical member for bending an optical axis at substantially right angle and a single lens with negative power.

13. An image pickup apparatus, comprising:
   an image pickup device for converting incident light into an electric signal; and
   an imaging optical system for imaging light from an object side on the image pickup device, the imaging optical system including in order from the object side:
   a first lens group with negative power, which is fixed with respect to a image plane during focusing and zooming;
   a second lens group with positive power;
   a third lens group with negative power;
   a fourth lens group with positive power; and
   a following lens group,
   wherein at least a moving lens group constituting the following lens group moves during zooming, and a movement distance MGB of the moving lens group from a wide angle end to a telephoto end, an overall focal length fw at the wide angle end, an over all focal length ft at the telephoto end, a distance LB between the most image side surface and an image plane which is minimum over a full zooming range and a diagonal length y of the image pickup device satisfy the following relationships:

$$0.2<MGB/(fw\times ft)^{1/2}<1.5$$

$$LB/y<0.8.$$

14. The image pickup apparatus of claim 13, wherein the second lens group and the fourth lens group move integrally during zooming, the moving lens group of the following lens group moves during focusing, and a magnification ratio βGB of the moving lens group when the overall focal length is $(fw\times ft)^{1/2}$ and a magnification ratio βGR of a lens group located on the image side of the moving lens group satisfy the following relationship:

$$0.4<|(1-\beta GB^2)\times\beta GR^2|<3.$$

15. The image pickup apparatus of claim 13, wherein the first lens group comprises a reflecting optical member for bending an optical axis at substantially right angle and a single lens, which has negative power.

* * * * *